JAMES MOODY, OF HARWICH, MASSACHUSETTS.

Letters Patent No. 84,567, dated December 1, 1868.

IMPROVEMENT IN WAGON-JACKS.

The Schedule referred to in these Letters Patent and making part of the same.

*To all whom it may concern:*

Be it known that I, JAMES MOODY, of Harwich, in the county of Barnstable, and State of Massachusetts, have invented a new and improved Wagon-Jack; and I do hereby declare that the following is a full, clear, and exact description thereof, which will enable others skilled in the art to make and use the same, reference being had to the accompanying drawings, forming part of this specification.

Figure 1 is a side view of my improved jack, and showing, in red lines, the position of the parts when the lever is lowered.

Figure 2 is a detail sectional view of the same, taken through the line $x$–$x$, fig. 1.

Similar letters of reference indicate corresponding parts.

My invention has for its object to furnish an improved wagon or lifting-jack, simple in construction, effective in operation, and not liable to get out of order; and It consists in the construction of the various parts, as hereinafter more fully described.

A is the standard of the jack, consisting of two parallel bars or plates, $a^1$, securely attached, at their lower ends, to the base-block $a^2$, and placed at a suitable distance apart to receive the other parts of the jack between them.

B are two parallel bars or plates placed within and between the outer bars, $a^1$, with which they correspond in shape.

$b'$ is an inclined block, having steps or notches formed in its upper side, and which is securely attached to the upper ends of the two bars B, so as to be raised and lowered with the said bars.

C are two parallel bars or plates, corresponding in shape with the shape of the bars B, between which they are placed.

D is the operating-lever, which is made in about the shape shown in fig. 1, and which is pivoted to and between the interior parallel bars C, as shown in fig. 2, and in dotted lines in fig. 1.

E is a pin, passing through holes in the outer parallel bars $a^1$, through vertical slots in the intermediate parallel bars B, through curved slots in the interior bars C, and through a hole in the lever D, as shown in figs. 1 and 2.

F is a pin, passing through vertical slots in the exterior parallel bars $a^1$, and through holes in the intermediate and interior parallel bars, B and C, as shown in the drawings.

By this construction, as the outer end or handle of the lever D is lowered, the intermediate parallel bars B are raised vertically upon the pin E, and carrying the pin F up with them along the slot in the outer bars $a^1$, while, at the same time, the interior bars C are moved upward and rearward, as their movement is guided by the curved slots in the upper parts of said bars C moving upon the pin E, so that when the lever D is lowered into the position shown in fig. 1, the jack will be fully raised and locked.

In using the jack, it is moved forward under the axle of the carriage or other object to be raised, until the said axle or other object rests upon one or the other of the notches or steps upon the upper side of the inclined block $b'$. The lever D is then lowered, raising the object away from the ground, and locking the jack in position, so as to hold the object raised. When the purpose for which the object was raised has been accomplished, it may be lowered gently to the ground, by simply raising the free end of the lever D.

L. WHEELOCK.
Magazine Fire Arm.
No. 84,598. Patented Dec. 1, 1868.
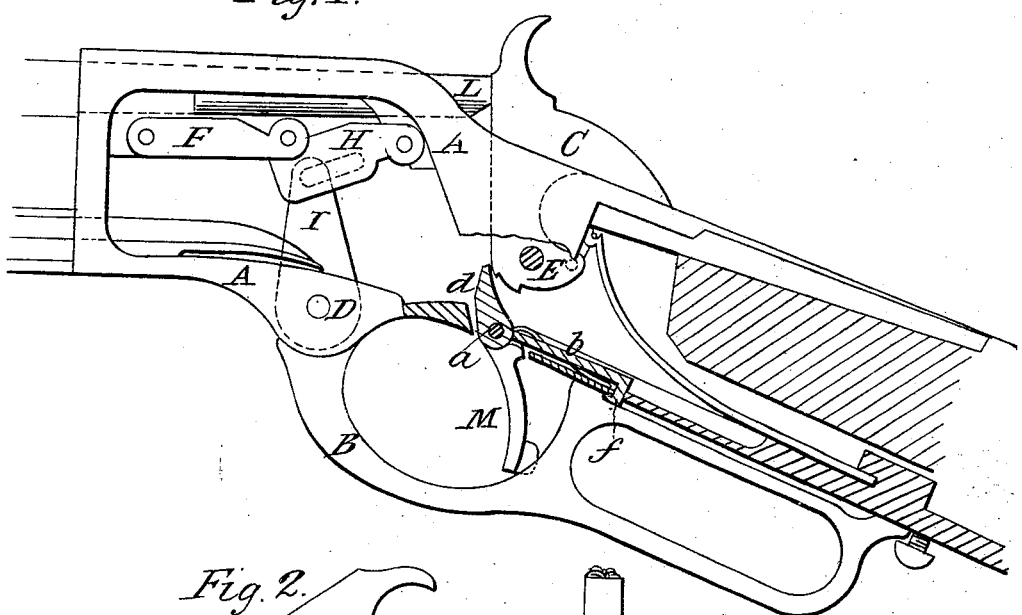
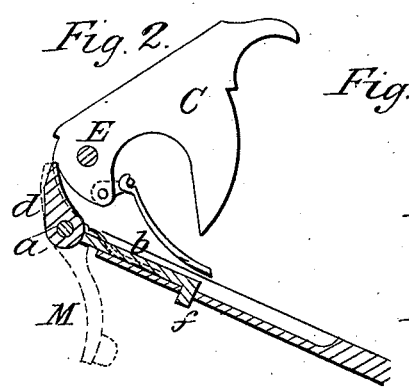 

I claim as new, and desire to secure by Letters Patent—

The wagon-jack, constructed as described, of the base-block $a^2$, parallel side bars $a^1$, provided with vertical slots, and carrying the notched block $b'$, the intermediate parallel bars B, slotted vertically, the interior parallel bars C, having the curved slots, the fixed pin E, sliding pin F, and lever D, all operating as described, whereby, as the bars B C and pin F are raised by the depression of the lever, the bars C are thrown rearward, locking the lever D in position, for the purpose specified.

JAMES MOODY.

Witnesses:
OBED BROOKS,
GEO. H. SNOW.